(12) United States Patent
Li et al.

(10) Patent No.: US 12,416,455 B2
(45) Date of Patent: Sep. 16, 2025

(54) LIQUID COOLING HEAT DISSIPATION STRUCTURE AND GEARBOX HOUSING

(71) Applicant: Jing-Jin Electric Technologies Co., Ltd., Beijing (CN)

(72) Inventors: Jianwen Li, Beijing (CN); Xudong Yang, Beijing (CN); Xianwen Zeng, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 381 days.

(21) Appl. No.: 18/005,117

(22) PCT Filed: Aug. 14, 2020

(86) PCT No.: PCT/CN2020/109211
§ 371 (c)(1),
(2) Date: Jan. 11, 2023

(87) PCT Pub. No.: WO2022/021483
PCT Pub. Date: Feb. 3, 2022

(65) Prior Publication Data
US 2023/0258260 A1 Aug. 17, 2023

(30) Foreign Application Priority Data
Jul. 27, 2020 (CN) .......................... 202010730206.5

(51) Int. Cl.
| F28F 3/12 | (2006.01) |
| F16H 57/04 | (2010.01) |
| F28D 1/06 | (2006.01) |
| F28F 13/08 | (2006.01) |
| F28D 21/00 | (2006.01) |

(52) U.S. Cl.
CPC ........... *F28F 3/12* (2013.01); *F16H 57/0415* (2013.01); *F16H 57/0423* (2013.01); *F28D 1/06* (2013.01);
(Continued)

(58) Field of Classification Search
CPC .... F28F 3/12; F16H 57/0413; F16H 57/0417; F16H 57/0423
See application file for complete search history.

(56) References Cited

U.S. PATENT DOCUMENTS

| 4,607,601 A | 8/1986 | Kohler |
| 6,997,238 B1 | 2/2006 | Ruthy et al. |
(Continued)

FOREIGN PATENT DOCUMENTS

| CN | 207559753 U | 6/2018 |
| CN | 209666827 U | 11/2019 |
(Continued)

OTHER PUBLICATIONS

Notice of Reasons for Refusal issued Mar. 26, 2024 in Japanese Patent Application No. 2023-505802, 10 pages.
(Continued)

*Primary Examiner* — Abiy Teka
(74) *Attorney, Agent, or Firm* — ARENTFOX SCHIFF LLP

(57) ABSTRACT

A liquid cooling heat dissipation structure and a gearbox casing that includes heat dissipation structure are disclosed. The heat dissipation structure includes a coolant tank and a cover plate that is used to seal the coolant tank. Two ends of the coolant tank are respectively provided with a liquid inlet and a liquid outlet. The coolant tank is provided therein with a plurality of fixed guide ribs that are arranged alternately and at intervals to form a continuous S-shaped or maze shaped channel for the coolant to flow through. The suspended guide ribs are further provided between the fixed guide ribs or between a fixed guide rib and an inner wall of the coolant tank.

14 Claims, 1 Drawing Sheet

(52) U.S. Cl.
CPC ...... *F28F 13/08* (2013.01); *F28D 2021/0089* (2013.01)

(56) References Cited

U.S. PATENT DOCUMENTS

| | | | |
|---|---|---|---|
| 11,662,012 B2* | 5/2023 | Li | F16H 57/0424 |
| | | | 165/80.4 |
| 2006/0283183 A1* | 12/2006 | Shibata | F16H 57/0415 |
| | | | 60/456 |
| 2019/0383389 A1 | 12/2019 | Shin et al. | |

FOREIGN PATENT DOCUMENTS

| | | |
|---|---|---|
| CN | 110601450 A | 12/2019 |
| CN | 110630731 A | 12/2019 |
| CN | 211032222 U * | 7/2020 |
| CN | 111828600 A | 10/2020 |
| DE | 202005005452 U1 | 9/2006 |
| JP | 2004248402 A | 9/2004 |
| JP | 2004296748 A | 10/2004 |
| JP | 2017028798 A | 2/2017 |

OTHER PUBLICATIONS

PCT International Search Report mailed Apr. 14, 2021, issued in PCT Application No. PCT/CN2020/109211.
Notification of First Office Action mailed Apr. 20, 2022, issued in corresponding Chinese Application No. 202010730206.5.
Extended European Search Report in EP20947769.4, mailed Oct. 9, 2023, 4 pages.
Office Action in EP20947769.4, mailed Oct. 20, 2023, 7 pages.

* cited by examiner

LIQUID COOLING HEAT DISSIPATION STRUCTURE AND GEARBOX HOUSING

CROSS-REFERENCE TO RELATED APPLICATIONS

This application is a National Phase of PCT/CN2020/109211, filed on Aug. 14, 2020, which claims priority to Chinese Patent Application No. 202010730206.5, filed on Jul. 27, 2020, the disclosures of each of which are hereby incorporated by reference in their entireties.

TECHNICAL FIELD

The present disclosure belongs to the technical field of gearbox structure, and more specifically, relates to a liquid cooling heat dissipation structure and a gearbox casing.

BACKGROUND

With the continuous development of the automobile industry, the gearbox and the entire power system need to face increasingly complex working conditions and users have comprehensive requirements on the maximum speed, temperature rise and service life of the gearbox urgently. The gearbox casing using conventional heat dissipation structures can no longer meet the development requirements of the automobile industry for vehicles with high power, high torque, maximum speed and maximum service life.

At present, the conventional liquid cooling heat dissipation structures of the gearbox casing have the disadvantages of small heat dissipation area and coolant blind area, which leads to low heat exchange rate between the gearbox casing and coolant and poor heat dissipation performance, and to a certain extent, damages the gearbox casing and internal heated parts, and affects the transmission performance and service life of the gearbox system.

SUMMARY

In view of the above problems, the present disclosure discloses a liquid cooling heat dissipation structure and a gearbox casing to overcome the above problems or at least partially solve the above problems.

In order to achieve the above objects, the present disclosure adopts the following technical solutions.

An aspect of the present disclosure discloses a liquid cooling heat dissipation structure, comprising a coolant tank and a cover plate, wherein
the cover plate is used to seal the coolant tank, and two ends of the coolant tank are respectively provided with a liquid inlet and a liquid outlet;
the coolant tank is provided therein with a plurality of fixed guide ribs that are arranged alternately and at intervals to form a continuous S-shaped or maze shaped channel for the coolant to flow through;
suspended guide ribs are further provided between the fixed guide ribs or between a fixed guide rib and an inner wall of the coolant tank, and the fixed guide ribs and the suspended guide ribs are provided to increase heat dissipation area, avoid eddies in a flow path and improve heat dissipation performance.

Further, the suspended guide ribs between the fixed guide ribs are provided in parallel with the fixed guide ribs; and/or the suspended guide ribs are not parallel to the fixed guide ribs or the inner wall of the coolant tank, so as to make the coolant flow fully and avoid eddies in the flow path.

Further, a bottom part of the coolant tank has different depths at two sides of the suspended guide rib, so that both inner and outer sides of the bottom part of the coolant tank are of a wavy shape.

Further, an amplitude of the wavy shape at the bottom part of the coolant tank is reduced step by step from the liquid inlet to the liquid outlet.

Further, positions and shape of the suspended guide ribs are set according to positions of the liquid inlet and the liquid outlet, and the flow path and flow rate of the coolant.

Further, the suspended guide ribs are a truncated cone, and a side surface of the truncated cone is composed of an arc surface and/or an inclined surface to avoid eddies in the flow path.

Further, a top part of a tank wall of the coolant tank is provided with a groove, the groove is provided therein with a sealing washer, and a plurality of threaded holes are provided outside the groove for fixing the cover plate with screws.

Another aspect of the present disclosure discloses a gearbox casing, wherein the heat dissipation structure as described above is provided on a top part of the gearbox casing and/or a side part close to the top part, so as to cool a lubricating liquid inside the gearbox casing.

Further, the heat dissipation structure is provided at the bottom part of the gearbox casing and/or the side part close to the bottom part, so that the cover plate and the bottom part or the side part are in a same plane when the cover plate is fixed.

Further, the liquid inlet is communicated with a coolant channel inside a motor water jacket; or
the liquid inlet is connected with an outlet of a motor coolant channel.

The advantages and beneficial effects of the present disclosure are as follows.

In the liquid cooling heat dissipation structure according to the present disclosure, by providing suspended guide ribs and fixed guide ribs that guide the flow direction of the circulating coolant, the heat dissipation contact area between the coolant and the heat dissipation structure is increased, the eddies of the coolant in the heat dissipation structure can be effectively prevented, and blind areas where the coolant does not flow or eddies are generated can be avoided. The liquid cooling heat dissipation structure has high heat exchange efficiency and low cost compared with other heat dissipation means.

BRIEF DESCRIPTION OF DRAWINGS

By reading the detailed description of the preferred embodiments below, various other advantages and benefits will become clear to a person of ordinary skill in the art. The accompanying drawings are only used for the purpose of illustrating the preferred embodiments, and should not be considered as a limitation to the present disclosure. Moreover, throughout the drawings, the same reference numerals are used to denote the same components. In the drawings.

Figure 1:
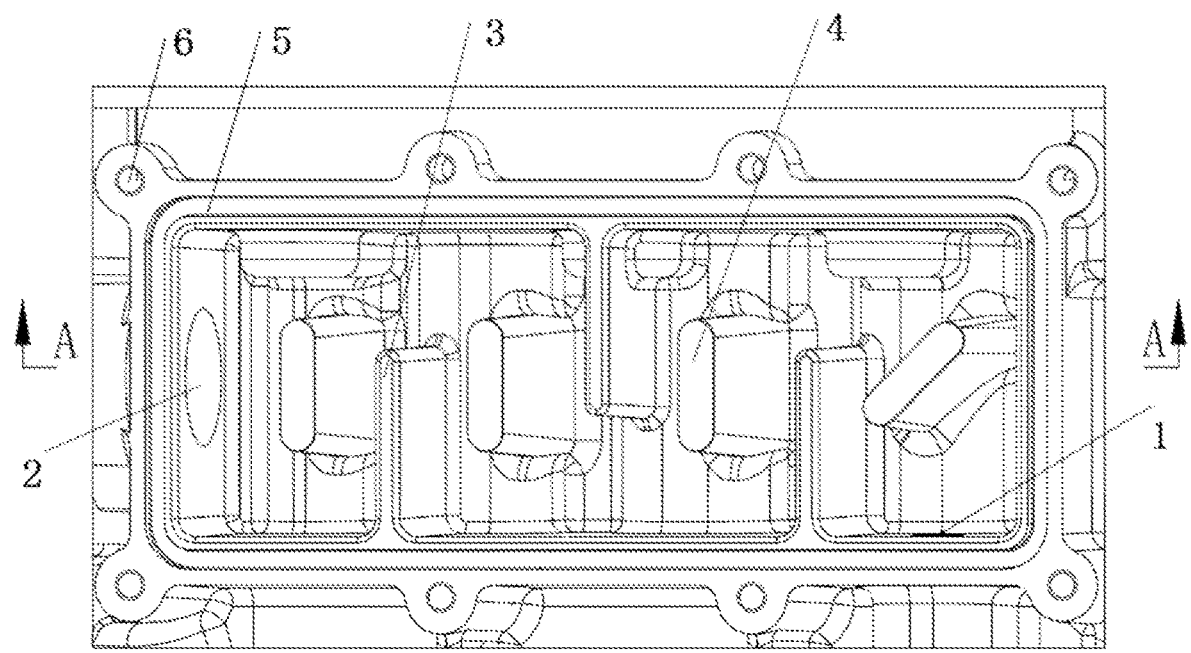
FIG. 1 is a schematic view of a liquid cooling heat dissipation structure according to an embodiment of the present disclosure.

In the drawings: 1. liquid inlet, 2. liquid outlet, 3. fixed guide rib, 4. suspended guide rib, 5. groove, 6. threaded hole.

DETAILED DESCRIPTION

In order to make the objectives, technical solutions, and advantages of the present disclosure clearer, the technical solutions of the present disclosure will be described clearly and completely in conjunction with specific embodiments of the present disclosure and corresponding drawings. Obviously, the embodiments described herein are only part of the embodiments of the present disclosure, rather than all of the embodiments. Based on the embodiments in the present disclosure, all other embodiments obtained by a person of ordinary skill in the art without paying creative work shall fall within the protection scope of the present disclosure.

The technical solutions of embodiments of the present disclosure will be described in detail below in conjunction with the accompanying drawings.

First Embodiment

An embodiment of the present disclosure discloses a liquid cooling heat dissipation structure. As shown in FIG. 1, the liquid cooling heat dissipation structure comprises a coolant tank and a cover plate. The cover plate is used to seal the coolant tank and prevent the coolant from flowing out. The two ends of the coolant tank are respectively provided with a liquid inlet 1 and a liquid outlet 2, and the positions of the liquid inlet 1 and the liquid outlet 2 can be set as required. The coolant flows in from the liquid inlet 1 and flows out from the liquid outlet 2 after heat exchange in the coolant tank. The liquid outlet 2 is disposed higher than the liquid inlet 1 to facilitate heat transfer.

The coolant tank is provided with a plurality of fixed guide ribs 3 arranged alternately and at intervals to form a continuous S-shaped or maze shaped channel for the coolant to flow through. The fixed guide ribs 3 are provided to increase the flow path of the coolant in the coolant tank, thereby increasing the contact area between the coolant and inner walls of the coolant tank and promoting heat exchange. One end of the fixed guide ribs 3 is connected with an inner wall of the coolant tank at a certain angle to prevent the coolant flow blind area. A certain gap is provided between the other end of the fixed guide ribs 3 and the inner wall of the coolant tank at the other side. The angle and gap between the fixed guide ribs 3 and the inner wall of the coolant tank can be adjusted according to the coolant flow path and flow rate. The number and thickness of fixed guide ribs 3 can be adjusted according to the size and wall thickness of the heat dissipation structure.

Suspended guide ribs 4 are further provided between the fixed guide ribs 3 or between a fixed guide rib 3 and an inner wall of the coolant tank. Only the bottom part of the suspended guide ribs 4 is connected with the bottom part of the coolant tank. The fixed guide ribs 3 and the suspended guide ribs 4 are provided to increase the heat dissipation area, avoid eddies in the flow path, and improve the heat dissipation performance.

In the liquid cooling heat dissipation structure according to the present disclosure, by providing the suspended guide ribs 4 and the fixed guide ribs 3 to guide the flow direction of the circulating coolant and provide flow resistance in different directions for the circulating coolant entering the coolant tank via the liquid inlet 1, the coolant is guided to flow along the designed path, thereby preventing the circulating coolant from bypassing some parts of the coolant tank and flowing directly to the liquid outlet 2, i.e., preventing the coolant blind area, so that the circulating coolant is fully contacted with the whole inner surface of the coolant tank, and the heat dissipation contact area between the coolant and the heat dissipation structure is increased. The liquid cooling heat dissipation structure according to the present disclosure has high heat exchange efficiency, relatively simple structure and low cost compared with other heat dissipation structures.

In an embodiment, as shown in FIG. 1, some suspended guide ribs 4 between the fixed guide ribs 3 are arranged in parallel with the fixed guide ribs 3 to divide the flow of coolant and increase the heat dissipation contact area.

Other suspended guide ribs 4 are not parallel to the fixed guide ribs 3 or the inner wall of the coolant tank, so that the coolant can flow fully to avoid eddies in the flow path.

Figure 2:
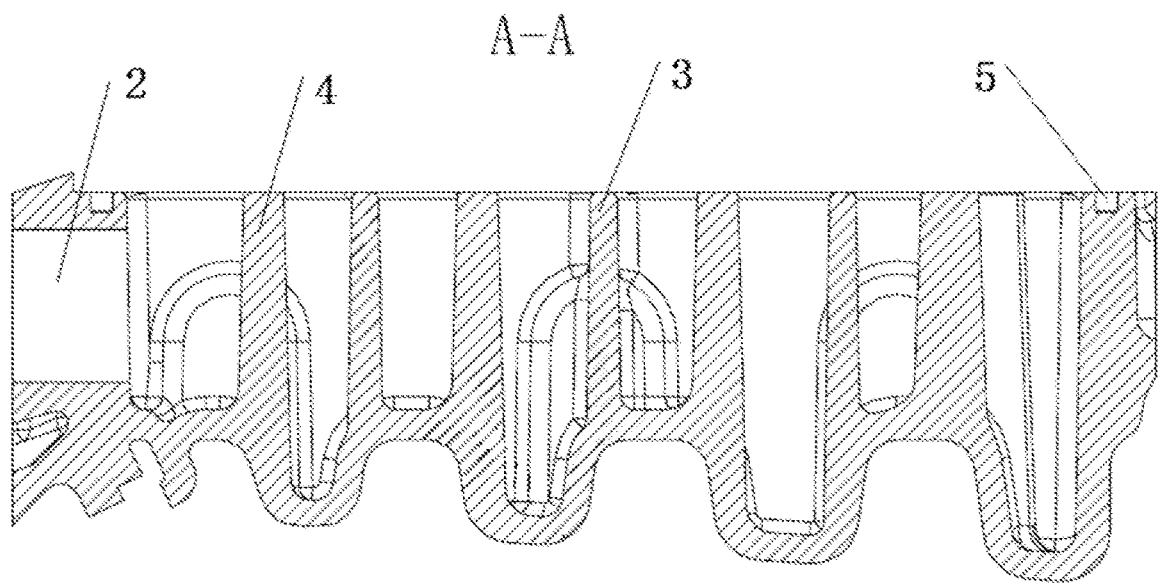
FIG. 2 is a sectional view taken along line A-A in FIG. 1 according to an embodiment of the present disclosure.

In an embodiment, as shown in FIG. 2, the bottom part of the coolant tank has different depths at two sides of the suspended guide rib 4, so that both the inner and outer sides of the bottom part of the coolant tank are of a wavy shape, thereby increasing the contact area between the coolant and the bottom part of the coolant tank to promote heat dissipation. The amplitude of the wavy shape can be adjusted. When the outside of the bottom part of the coolant tank is in contact with a heat source, the wavy bottom part can also effectively increase the contact area between the bottom part of the coolant tank and the heat source, and promote the heat dissipation of the heat source.

In an embodiment, as shown in FIG. 2, the amplitude of the wavy shape of the bottom part of the coolant tank is reduced step by step from the liquid inlet 1 to the liquid outlet 2, which can avoid the coolant flow blind area and increase the heat dissipation effect.

In an embodiment, the positions and shape of the suspended guide ribs 4 are set according to the positions of the liquid inlet 1 and the liquid outlet 2, and the flow path and flow rate of the coolant. A certain angle is also formed between the suspended guide ribs 4 and the inner wall of the coolant tank. There is a certain gap between two sides of the suspended guide ribs 4 and the inner walls of the coolant tank at the two sides respectively. The coolant flows through the gap. The angle and gap between the suspended guide ribs 4 and the inner walls of the coolant tank can be adjusted according to the flow path and flow rate of the coolant. In addition, the number and thickness of the suspended guide ribs 4 can be adjusted according to the size and wall thickness of the liquid cooling heat dissipation structure.

In an embodiment, the suspended guide ribs 4 are a truncated cone, and the side surface of the truncated cone is composed of an arc surface and/or an inclined surface to avoid eddies in the flow path. Of course, the suspended guide ribs 4 may also be other structures with excellent fluid guiding effect. Similarly, the side surface of the fixed guide ribs 3 may also be composed of an arc surface and/or an inclined surface and has the same effect.

In an embodiment, a groove 5 is provided at a top part of the tank wall of the coolant tank, and a sealing washer is provided in the groove 5 to seal the coolant tank. A number of threaded holes 6 are provided outside the groove 5 to fix the cover plate with screws. The number and positions of threaded holes 6 can be adjusted as required.

Second Embodiment

An embodiment of the present disclosure discloses a gearbox casing. The heat dissipation structure as described above is provided on the top part of the gearbox casing and/or the side part close to the top part, so as to realize the cooling of the lubricating liquid inside the gearbox casing. The lubricating liquid contacts the bottom part of the heat dissipation structure, the heat is transferred from the lubricating liquid to the bottom part of the heat dissipation structure, and the coolant takes away the heat at the bottom part of the heat dissipation structure, thereby reducing the temperature inside the gearbox casing.

In an embodiment, the heat dissipation structure is provided at the bottom part of the gearbox casing and/or the side part close to the bottom part, so that the cover plate and the bottom part or the side part are in the same plane when the cover plate is fixed.

In an embodiment, the liquid inlet 1 may be disposed on an end face of the gearbox casing that is connected to a motor casing, and the liquid inlet 1 is communicated with a coolant channel inside a motor water jacket via a channel disposed on the motor casing. The circulating coolant enters the coolant tank of the gearbox from the motor coolant channel directly via the liquid inlet 1 disposed on the gearbox casing at the connecting surface.

A water nozzle is provided at the liquid inlet 1, and then the liquid inlet 1 is connected with an outlet of the motor coolant channel via a coolant pipe. The circulating coolant flows out from the outlet of the motor coolant channel, and enters the liquid inlet 1 disposed at the outer wall of the coolant tank of the gearbox via an external coolant pipe, and thus enters the coolant tank of the gearbox.

To sum up, the present disclosure discloses a liquid cooling heat dissipation structure and a gearbox casing. The liquid cooling heat dissipation structure comprises a coolant tank and a cover plate. The cover plate is used to seal the coolant tank, and two ends of the coolant tank are respectively provided with a liquid inlet and a liquid outlet. The coolant tank is provided therein with a plurality of fixed guide ribs that are arranged alternately and at intervals to form a continuous S-shaped or maze shaped channel for the coolant to flow through. The suspended guide ribs are further provided between the fixed guide ribs or between a fixed guide rib and an inner wall of the coolant tank. The fixed guide ribs and the suspended guide ribs are provided to increase heat dissipation area, avoid eddies in a flow path and improve heat dissipation performance. In the liquid cooling heat dissipation structure according to the present disclosure, by providing suspended guide ribs and fixed guide ribs that guide the flow direction of the circulating coolant, the heat dissipation contact area between the coolant and the heat dissipation structure is increased, the eddies of the coolant in the heat dissipation structure can be effectively prevented, and blind areas where the coolant does not flow or eddies are generated can be avoided. The liquid cooling heat dissipation structure has high heat exchange efficiency and low cost compared with other heat dissipation means.

The above only describes the specific embodiments of the present disclosure. Under the above teaching of the present disclosure, a person skilled in the art can make other improvements or modifications on the basis of the above embodiments. A person skilled in the art should understand that the above specific description is turned only for the purpose of better explaining the present disclosure, and the protection scope of the present disclosure should be subject to the protection scope of the claims.

What is claimed is:

1. A liquid cooling heat dissipation structure, comprising:
   a coolant tank including two ends that have a liquid inlet and a liquid outlet, respectively; and
   a cover plate configured to seal the coolant tank;
   wherein the coolant tank is provided therein with a plurality of fixed guide ribs that are arranged alternately and at intervals to form a continuous S-shaped or maze shaped channel for coolant to flow through,
   wherein suspended guide ribs are arranged between the fixed guide ribs or between a fixed guide rib and an inner wall of the coolant tank, and
   wherein the fixed guide ribs and the suspended guide ribs are configured to increase heat dissipation area, avoid eddies in a flow path and improve heat dissipation performance,
   wherein a bottom part of the coolant tank has different depths at two sides of the suspended guide ribs, so that both inner and outer sides of the bottom part of the coolant tank comprise a wavy shape, and
   wherein an amplitude of the wavy shape at the bottom part of the coolant tank is reduced step by step from the liquid inlet to the liquid outlet.

2. The heat dissipation structure according to claim 1, wherein the suspended guide ribs between the fixed guide ribs are provided in parallel with the fixed guide ribs.

3. The heat dissipation structure according to claim 1, wherein positions and shape of the suspended guide ribs are set according to positions of the liquid inlet and the liquid outlet, and the flow path and flow rate of the coolant.

4. The heat dissipation structure according to claim 3, wherein the suspended guide ribs are a truncated cone, and a side surface of the truncated cone comprises at least one of an arc surface and an inclined surface to avoid eddies in the flow path.

5. A gearbox casing including the heat dissipation structure according to claim 4, wherein the is provided on at least one of a top part of the gearbox casing and a side part, so as to cool a lubricating liquid inside the gearbox casing.

6. A gearbox casing including the according to claim 3, wherein the is provided on at least one of a top part of the gearbox casing and a side part, so as to cool a lubricating liquid inside the gearbox casing.

7. The heat dissipation structure according to claim 1, wherein a top part of a tank wall of the coolant tank is provided with a groove, the groove is provided therein with a sealing washer, and a plurality of threaded holes are provided outside the groove for fixing the cover plate with screws.

8. A gearbox casing including the according to claim 7, wherein the is provided on at least one of a top part of the gearbox casing and a side part, so as to cool a lubricating liquid inside the gearbox casing.

9. A gearbox casing including the heat dissipation structure according to claim 1, with the heat dissipation structure being provided on at least one of a top part of the gearbox casing and a side part, so as to cool a lubricating liquid inside the gearbox casing.

10. The gearbox casing according to claim 9, wherein the heat dissipation structure is provided on at least one of a bottom part of the gearbox casing and the side part, so that the cover plate and the bottom part or the side part are in a same plane when the cover plate is fixed.

11. The gearbox casing according to claim 10, wherein the liquid inlet is communicated with a coolant channel inside a motor water jacket; or the liquid inlet is connected with an outlet of a motor coolant channel.

12. The gearbox casing according to claim 9, wherein the liquid inlet is communicated with a coolant channel inside a motor water jacket; or the liquid inlet is connected with an outlet of a motor coolant channel.

13. A gearbox casing including the heat dissipation structure according to claim 1, wherein the heat dissipation structure is provided on at least one of a top part of the gearbox casing and a side part, so as to cool a lubricating liquid inside the gearbox casing.

14. A gearbox casing including the heat dissipation structure according to claim 1, wherein the is provided on at least one of a top part of the gearbox casing and a side part, so as to cool a lubricating liquid inside the gearbox casing.

* * * * *